(No Model.)
P. RIESECK.
MEAT AND VEGETABLE CHOPPING MACHINE.
No. 304,035. Patented Aug. 26, 1884.
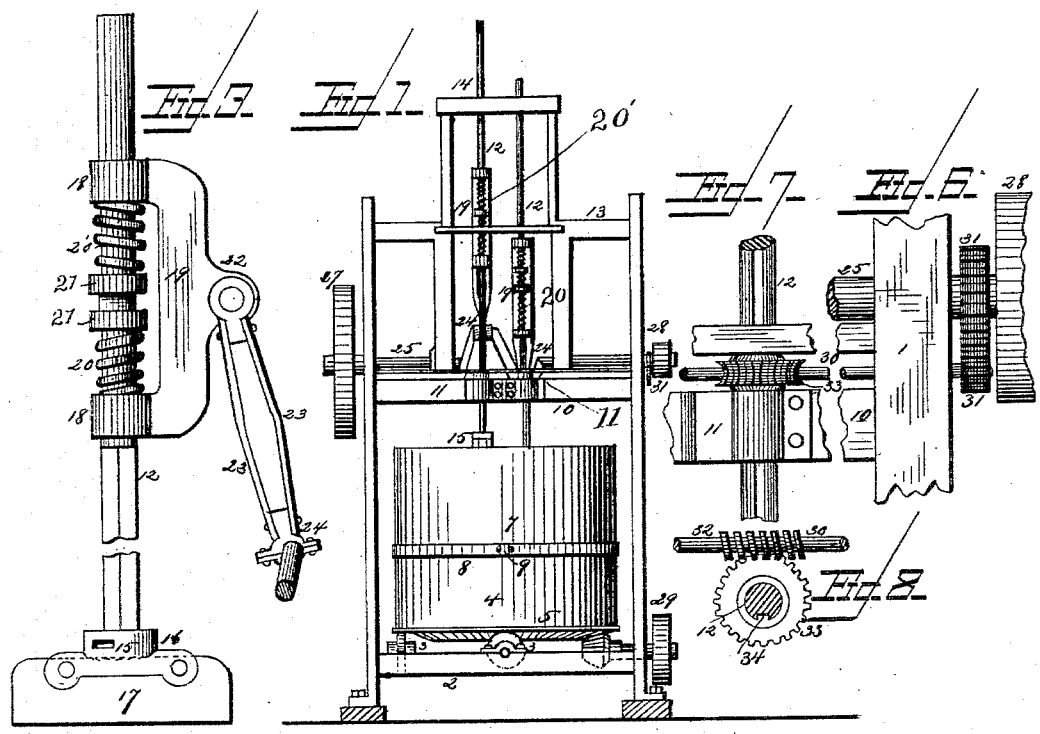
WITNESSES
F. L. Ourand
John T. Suter, Jr.
INVENTOR
Peter Rieseck
O. D. Levis  Attorney

UNITED STATES PATENT OFFICE.

PETER RIESECK, OF PITTSBURG, PENNSYLVANIA.

MEAT AND VEGETABLE CHOPPING MACHINE.

SPECIFICATION forming part of Letters Patent No. 304,035, dated August 26, 1884.

Application filed July 30, 1883. (No model.)

*To all whom it may concern:*

Be it known that I, PETER RIESECK, a citizen of the United States, residing at Pittsburg, in the county of Allegheny and State of Pennsylvania, have invented a new and useful Meat and Vegetable Chopping Machine, of which the following is a specification.

My invention relates to improvements in meat and vegetable chopping machines in which vertically-reciprocating knives operate in conjunction with a rotating chopping-block; and the invention I have made consists of a means whereby the knives are given an independent yielding support each in its own bearings, which enables them to strike with more or less force, proportioned to the character of work required, and at the same time prevents them from being injured on coming in contact with a bone or other hard substance, thus obviating the detrimental shocks and jars imparted to the knives when in their downward movement they meet with any obstructive material; also, in the means by which the knives may be swung separately out of the pan and brought to a suitable position for sharpening or other purposes without disengaging them from their respective operating-rods.

Another part of my invention consists in the combination, with each knife-rod, of a sliding yoke connected to its respective crank by means of an elastic pitman, whereby the sudden jolt on the cranks is mitigated and the strain of the machine considerably lessened.

The improvements I have made will be readily understood from the following description, taken in connection with the accompanying drawings, wherein—

Figure 1 represents a front elevation of my meat and vegetable chopper; Fig. 2, a side elevation of the same, and having a portion of the frame removed the better to exhibit the manner in which the knives are swung out of the pan. Figs. 3, 4, 5, and 6 represent detached and enlarged views of different parts of the machine, that aid in illustrating my improvements. Figs. 7 and 8 show a means I employ to give a rotary movement to the knives.

Similar letters refer to like parts in the several views.

The frame of this machine consists of a suitable stand, 1, supporting a table, 2, on which, in anti-friction wheels 3, revolves the chopping-block 4, to the bottom of which is firmly attached a circular rack, 5, and one, 6, of the anti-friction wheels is provided with cogs that operate to give a rotary movement thereto by means presently described.

Above and around the upper edge of the wooden chopping-block 4 is a deep pan, 7, conforming in size thereto, and held in place by a circumferential band, 8, so applied and contracted by a suitable pinch-screw, 9, as to securely hold the pan to the block or admit of its ready disconnection when required.

Located above the pan 7, and extending across it from side to side of the stand 1, is a stout horizontal bar, 10, to the front of which are bolted suitable guides, 11, for supporting the respective knife-rods 12 in their up-and-down motion, and these guides 11 are so constructed and hinged to said bar 10 as to admit of being opened to release the knife-rods therefrom, as seen more particularly in Fig. 5.

Nearer the top of the stand 1 are two cross-pieces, 13 14, which serve to assist the guides 11 below in holding the knife-rods 12 in a vertical position while in action, but do not prevent their release when the guides are opened for that purpose. To the lower end of each of these vertically-moving rods 12 is rigidly attached, by means of a transverse key, 15, a T-shaped head, 16, between the arms of which is properly affixed a broad-bladed chopping-knife, 17, after the manner usual in such cases. Each knife-rod 12 extends through the arms 18 of an individual yoke, 19, so contrived as to allow the rod to have a limited longitudinal movement therein, depending on the elasticity of two spiral springs, 20, arranged around the rod between the arms of the yoke, which springs are regulated with respect to tension each by means of a suitable screw-nut, 21. The lowermost spring, 20, or that nearest the knife, carries the entire weight of the cutter-rod in its upward movement, while the other spring, 20', receives and modifies the shock necessarily produced by the knives coming in sudden contact with the material operated on or any obstruction offered to their free downward movement.

At the back of each yoke 19 is a projection, 22, and to it are pivoted the ends of two outwardly-curved flexible strips, 23, that together constitute a yielding pitman, connecting the yokes each to its proper crank, 24, which cranks 24 are arranged side by side on and make part of the main shaft 25, and with such relative position as that when one is up the other will be down. The main shaft 25 is arranged parellel to, but a little distance from, the cross-bar 10, to which the open and shut guides 11 are attached, and has its bearings in brackets 26, that project from the opposite side of said bar.

At one end of the main shaft 25 is a pulley, 27, by which motion may be communicated to the operable parts of the machine through the instrumentality of a belt driven by the power of steam or otherwise; and at the opposite end of said main shaft 25 is a smaller pulley, 28, connecting it by means of a suitable belt (not shown) with a similar pulley, 29, on the spindle of the cogged wheel 6, that operates in conjunction with the circular rack 5 at the bottom of the chopping-block 4, to give a requisite rotary movement thereto. Sometimes it is found essential to give the knives a continuous rotation, especially when chopping some kinds of meat, and to this end a small shaft, 30, is arranged parallel to the main shaft, and is geared thereto by means of suitable cog-wheels, 31. This secondary shaft, 30, is provided with an endless screw, 32, operating in a worm-wheel, 33, around each knife-rod 12; and to cause the rod to turn therewith a spline, 34, is formed on the rod or inserted longitudinally therein, and a corresponding groove cut in the worm-wheel 33, or vice versa, by which the desired object may be attained. Should either of the knives require sharpening, the machine should be temporarily stopped, that the guides 11 may be opened to release the proper knife, which can then be raised from the pan and turned or swung to one side for that purpose.

I am aware that it is not new in a meat-chopping machine to impart a rotary motion to the cutters by means of an endless screw and worm-wheel. I therefore do not claim such mechanism, broadly.

Having thus described my invention, I claim as new and desire to secure by Letters Patent—

1. The combination, in a meat-chopping machine in which vertically-reciprocating knives operate in conjunction with a rotating chopping-block, of the sliding yoke 19 and spiral springs 20 between its arms and around the knife-rod, upon which are arranged screw-nuts 21, for regulating the tension of said springs, in the manner shown, for the purposes set forth.

2. In a machine of the character described, a sliding yoke, 19, on the knife-rod, and springs 20 and regulating-nuts, in combination with a flexible pitman, 23, that connects said yoke to the crank-shaft, in the manner shown.

3. In a meat-chopping machine, the rod 12, provided with yoke 19, having a pitman hinged thereto, and a crank-shaft, 25, mounted in brackets 26, as specified, in combination with the cross-bar 10, having hinged guides 11 secured thereto, whereby the knives may be turned and swung outside of the pan, substantially as described, and for the purposes set forth.

4. In a meat-chopping machine, the rod 12, provided with nuts 21, spiral springs 20 20', and the yoke 19, in combination with the crank-shaft 25 and the flexible pitman 23, whereby the pitman may expand and contract longitudinally and the knife be given a yielding stroke.

5. In a meat-chopping machine, the grooved rod 12, provided with nuts 21, worm-wheel 33, spline 34, spiral springs 20 20', and the yoke 19, the crank-shaft 25, and the flexible pitman 23, in combination with the secondary shaft 30 and cog-wheels 31, substantially as described, and for the purposes set forth.

PETER RIESECK.

Witnesses:
O. D. LEVIS,
A. RIESECK.